Feb. 20, 1968     E. N. BAMBERGER     3,369,942
BEARING AND METHOD OF MAKING
Filed Feb. 24, 1964
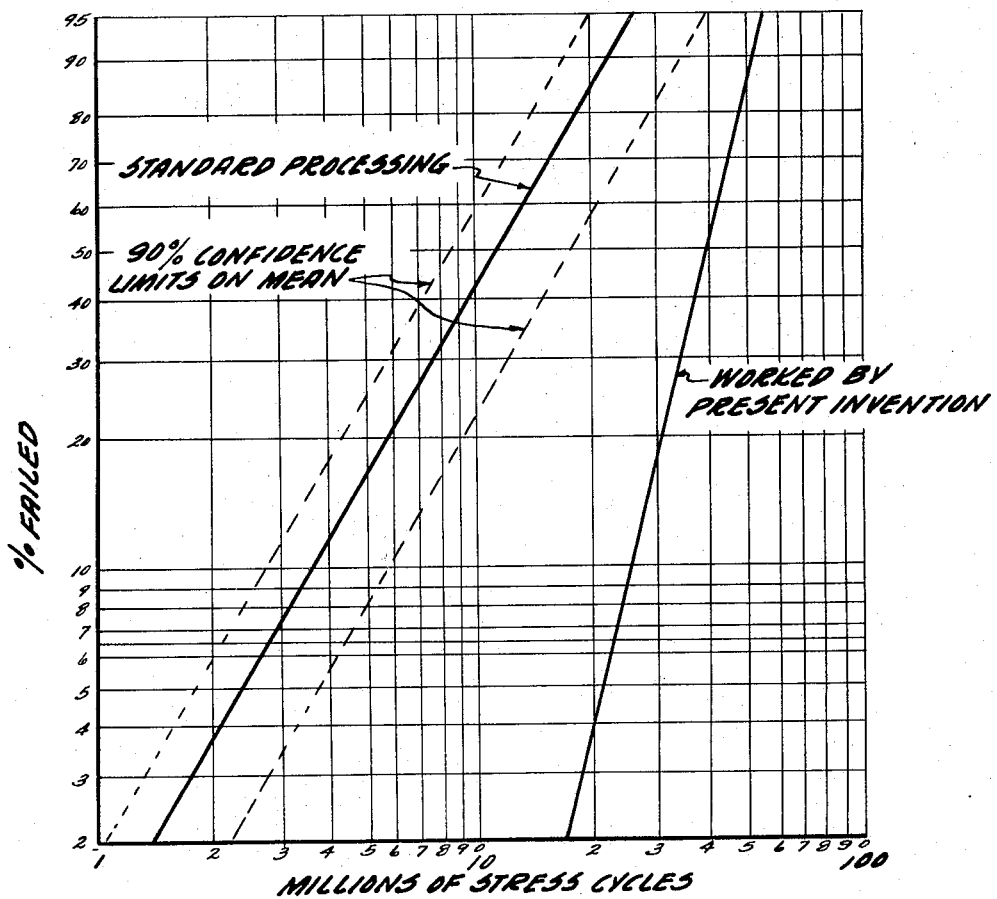
INVENTOR.
ERIC N. BAMBERGER
BY
ATTORNEY

3,369,942
BEARING AND METHOD OF MAKING
Eric N. Bamberger, Cincinnati, Ohio, assignor to General Electric Company, a corporation of New York
Filed Feb. 24, 1964, Ser. No. 346,778
8 Claims. (Cl. 148—11.5)

This invention relates to load carrying members such as bearings and more particularly, to a bearing of improved rolling contact fatigue life and to a method for making the bearing.

Bearings, which provide low friction relative motion between components, are critical in almost all energy producing power plants. Their improvement through constant evolution of better designs, lubrication and materials and through better understanding of important criteria has steadily contributed to improvements in power generating equipment and to better efficiency in operation of such equipment. Today's high performance, high speed aircraft engines require bearings with extremely high reliability, preferably approaching 100%, despite the fact that these bearings are operated under unusually strenuous loading conditions.

A bearing designer is faced with the problem of developing bearings which can operate at increased speeds, loads and reliability levels yet at reduced weight, size and cost compared with known bearings. Advances in steel metallurgy have assisted the designer to a certain extent. The family of high speed tool steels of the "M" type, some of which are known commercially as M–1, M–2, M–10 and M–50 as well as some of the more recently developed materials such as type WB–49 has provided additional reliability and load carrying capabilities. However, the development of new bearing steels has not kept up with the need for improved bearings.

Indeed, the potentialities of developing new, improved bearing steels by conventional metallurgical practices are rather small. This is not to infer that such steels cannot be developed, but the cost involved in such an endeavor would be all out of proportion to the end results. This will be recognized by those expert in the art.

Consequently, the materials engineer must search for alternate methods by which to improve existing bearing steels in order to up grade their properties to meet the desired levels.

It has been established that hardness is one of the most influential factors affecting rolling contact fatigue life of bearings. Rolling contact fatigue life is a measure of the time that a bearing material can withstand without failure the severe compressive and cyclic shear stresses imposed upon it during its operation.

Some of this work has been reported by R. A. Baughman; "Effect of Hardness, Surface Finish and Grain Size on Rolling Contact Fatigue Life of M–50 Bearing Steel," ASME paper 59, LUB–11, 1959; and T. L. Carter, E. V. Zaretsky and W. J. Anderson, "Effective Hardness and other Mechanical Properties on Rolling Contact Fatigue Life of Four High Temperature Bearing Steels," NASA Space TN Space D–270, 1960. These references discuss an optimum hardness condition for bearing steels with regard to rolling contact fatigue life. A plot of rolling contact fatigue life against hardness has shown a peak hardness above which bearing life tends to decline. Therefore, with the most advanced tool steels available today, once the known conditions are established, the bearing designer must attempt to design his bearing with the knowledge that he has available a limited rolling contact fatigue life.

It is a principal object of the present invention to provide an improved bearing of known material which has been improved by processing.

Another object is to provide a method for improving the rolling contact fatigue life of a bearing material by particular processing.

These and other objects and advantages will be more readily recognized from the following detailed description, drawing and examples which are not meant to be limitations on the scope of the present invention.

The drawing is a graphical comparison between a bearing material processed by normal procedures and one processed according to the method of the present invention.

Briefly, the method aspect of the present invention comprises plastically deforming steel of the martensitic or semiaustenitic type, and capable of being hardened to 58 Rockwell C or above, in an amount represented by the work developed in a reduction in cross-sectional area of a workpiece of at least 70%, and preferably 70–85%, while the steel is in a metastable austenitic condition. This type of working results in some strain induced carbide precipitation. Then the steel is cooled below the temperature at which martensite starts to form ($M_s$) and as a result of the prior work the martensite which is formed is considerably finer in structure than that obtained by more standard processing techniques. A further aspect of the method form is then to temper the steel at a temperature below that at which it was worked in the metastable austenitic condition. This serves to additionally promote the precipitation of carbides. This temper step can develop additional hardness if the desired hardness of 58 Rockwell C or above was not attained upon cooling after working. Otherwise, it can be used to relieve stresses or develop ductility.

The bearing of the present invention comprises a martensitic or semiaustenitic steel having a hardness level of 58 Rockwell C or above for load carrying capacity, the microstructure of which is characterized by a fine, uniform carbide precipitation, substantially no massive carbide segregation and fine martensite platelet size as shown by high magnification microscopy. Thus references herein to size of microstructure means size when viewed at 3000 magnifications or above, particularly by electron microscopy.

Within recent years, a process has been developed which imparts high strength to certain steels having special transformation characteristics. This process, one form of which is sometimes called "Ausforming," in general involves the plastic deformation or working of the steel while it is in a metastable austenitic condition. Some details and special forms of this general process have been reported by Lips and Van Zuilen in Metal Progress, August 1954, pages 103 and 104 and by Schmatz, Shyne and Zackay in Metal Progress, September 1959, pages 66–69 as well as in their U.S. Patent 2,934,463. As is described in those and numerous other publications, the time-temperature transformation characteristics of the material must allow it to be worked in the metastable austenitic condition for at least that period of time necessary to develop the degree of work desired. As the references show, the metastable austenitic region lies below the $A_{c_1}$ temperature, above the $M_s$ temperature and prior in time to transformation to other forms such as pearlite or bainite. Therefore, as used in this specification, such terms as "working in the metastable austenitic condition" means that condition of the material after it has been cooled below the $A_{c_1}$ temperature but above the $M_s$ temperature and at an area in time before that which allows the massive formation of such transformation products as bainite or pearlite.

Thus it has been reported that this known type of process can impart improved strength to certain types of steels. It has also been established that it is not reliable to study mechanical data such as tensile tests, standard fatigue tests and the like and from these predict what the rolling contact fatigue life of a material will be. It is necessary to run specific rolling contact fatigue tests in order to determine what this mechanical property actually is. The understanding of rolling contact fatigue is different from an understanding of the other mechanical properties of a material. Because rolling contact fatigue life is not predictable from mechanical property data, it is not an expected result that the method of the present invention would result in such an improvement.

It has been unexpectedly recognized that by plastically deforming a steel of the martensitic or semiaustenitic type by reducing its cross-sectional area by at least about 70%, and preferably 70–85%, while the steel is in the metastable austenitic condition, a dramatic and unexpected increase in rolling contact fatigue life can be achieved without sacrificing the optimum hardness or maximum ductility which can be attained in the material. In present practice in bearing manufacture, the hardening mechanism is achieved by quenching the material from the austenitized state. In the as-quenched condition, the material is in a supersaturated solution. Upon subsequent tempering, carbides are precipitated to form the hardening mechanism. In the practice of the present invention, at levels of work developed by the at least 70% reduction in cross-sectional area of the material, the carbides are precipitated from solution as a result of the strain induced in the material while it is still in the metastable austenitic condition. These carbides are in a very fine, uniform dispersion. Consequently, when the material is then quenched to room temperature, most of the carbides are already out of solution and generally little, if any, additional hardening takes place during any subsequent tempering operation.

Materials which are preferable to use in the practice of the present invention are steels of the secondary hardening type: those which can be tempered at certain temperatures to obtain a hardness which is greater than that which results from the hardness obtained by tempering the same steel at a lower temperature for the same time. Some examples of these are commercially known as M–1, M–10 and M–50. During the tempering of such secondary hardening type alloy steels to which the method of the present invention has not been applied, the room temperature hardness which might start at about 60 Rockwell C will drop slightly through the early part of the tempering cycle until the secondary hardening mechanism begins to take effect. Then the hardness will increase, for example, to about 64 Rockwell C after which it begins to decline. However, because the practice of the present invention results in the different kind of alloy microstructure described above, there is no recognized secondary hardening mechanism occurring.

Typical of the M-type of tool steels which have transformation characteristics suitable for the practice of the method of the present invention is M–50 steel having a nominal composition, by weight, of 0.8% C, 4% Cr, 1% V, 4% Mo with the balance essentially iron and incidental impurities. Approximately, one inch diameter test bars of M–50 steel alloy were worked to varying degrees in the metastable austenitic condition by rolling techniques according to the following procedure: the material was first preheated at 1200° F. for one hour, austenitized at 2150° F. for one hour, then cooled to 1050° F. where it was worked by reducing in cross-sectional area by various percentages some of which are shown in the following table. Then the material was air cooled to 200° F. after which it was tempered at 600° F. for two hours. Further tempering treatments were then performed to achieve a recognized optimum hardness. All such subsequent tempering operations were performed below the 1050° F. ausforming temperature.

The following table shows the rolling contact fatigue life attained by the practice of the method of the present invention compared with standard heat treated material. The recommended standard heat treatment for M–50 alloy steel, and that with which the above treated material was compared, is to preheat at 1500° F. for 30 minutes, austenitize at 2150° F. for 60 minutes, air cool to black heat (about 3 minutes), quench into 800° F. salt and hold for 15 minutes, air cool to warm heat, and finally double temper for 2 hours at 1050° F.

TABLE.—ROLLING CONTACT FATIGUE LIFE

| Condition | $B_5$ Life ($10^6$ cycles) | Improvement (Percent) | $B_{10}$ Life ($10^6$ cycles) | Improvement (Percent) | $B_{50}$ Life ($10^6$ cycles) | Improvement (Percent) |
| --- | --- | --- | --- | --- | --- | --- |
| Std. Ht. Treat | 2.35 | | 3.55 | | 11.4 | |
| 40% work | 4.9 | 108 | 6.3 | 77 | 12.6 | 11 |
| 70% work | 9.0 | 283 | 13.4 | 277 | 38.5 | 238 |
| 80% work | 21.3 | 806 | 26.5 | 646 | 49.0 | 330 |

Because of the high stresses induced in the material by the work resulting from the higher percentages of reduction in cross-sectional area with the material in the metastable austenitic condition, it is important that thermal shock of the material after working be avoided. In one test conducted exactly as indicated above except that after about 71% reduction at 1050° F., the material was oil quenched at 75° F., there was severe cracking along the entire length of the bar specimen. Thus it is preferred to cool in still air to avoid thermal shock.

The rolling contact fatigue tests were conducted on the apparatus described in U.S. Patent 3,053,073—Baughman. The test bar-roller was cylindrical, three inches long and 0.375″ in diameter. Because it has been established that there is a direct correlation between the data obtained from this test equipment and full scale bearing tests results, it was possible to determine the life of actual bearings. The test conditions under which the data was obtained were:

Stress _____p.s.i. max. hertz__ 700,000
Applied load _____pounds__ 325
Temperature _____ Room
Lubricant _____ MIL–L–7808
Lube-rate _____drops/minute__ 20
Speed _____r.p.m__ 12,500
Stress rate _____stress cycles/minute__ 25,000

A minimum of 10 tests were run on each condition to establish the data.

In the above table, the $B_5$ life, $B_{10}$ life and $B_{50}$ life are terms of art well known to bearing designers and manufacturers. For example the $B_{10}$ life, which is frequently a design point for bearing designers, means that under given conditions, for example those listed for the data above, there is a 10% bearing failure probability. Similarly, $B_5$ means 5% probability and $B_{50}$ mean 50% probability. Graphical representations of the data, such as that of the drawing, sometimes termed "Weibull" curves, are generally used by designers.

The data of the above table clearly shows the dramatic and unexpected increase in rolling contact fatigue life resulting from the work imparted to the material by a reduction in cross-sectional area of about 70% or more, particularly at about 80%. From microstructural studies based on review of amounts of strain induced carbide percipitation, it is indicated that work greater than the 85% level will not develop significant improvements in rolling contact fatigue life properties. Although about 108% improvement is gained in the $B_5$ life at 40% work in the above table, this is not considered to be an appreciable gain compared with the amount of effort which must be put into working the material.

Microstructural studies were made comparing the standard heat treated and 40% worked M–50 steel alloy with that 70% and 80% worked alloy, data for which is shown in the above table. There was a striking difference between the microstructures, the most significant differences being the predominance of small, uniformly dispersed carbides, the apparent lack of martensitic matrix and what appears to be disintegration of massive carbides found in the standard heat treated material or in the material worked at a level below about 70%. Electron photomicrographs at 6000 magnifications, when etched with modified picral, shows the most striking difference in structure between normally processed M–50 alloy and 80% worked M–50 alloy. The fragmentation and partial spheroidization of massive carbides in the presence of uniformly dispersed small carbide particles, as well as the absence of any martensitic matrix, is easily discernible.

The above data shows that at the generally accepted bearing design point, the $B_{10}$ life, an unexpected 646% improvement in life is attained with the material worked to the preferred 80% level in the metastable austenitic condition. Through the practice of the present invention, the bearing designer can continue to specify bearings based on the design curve generated from standard bearings. By then substituting bearings made according to the present invention, he can increase his margin of safety by at least a factor of 6. If, on the other hand, a bearing designer is content with his present $B_{10}$ life failure probability, he can use the new $B_{10}$ life obtainable through the practice of the present invention and essentially operate his bearings 6 to 7 times larger. This can result in fewer bearing replacements and a substantial cost savings. More important, however, is the availability through the present invention of bearings which can meet some of the long life criteria presently being set for advanced propulsion systems. In addition, a new relationship can be established between increased life and physical size of the bearing. It is now possible that a smaller bearing can be used to carry the same load as a larger one of the old type, thus reducing the weight of the system, provided the static load capacity of the bearing is taken into consideration.

The solid lines in the drawing show a typical graphical comparison between M–50 alloy processed in the normal manner and M–50 aloy worked to the 80% level in accordance with the present invention. In order to show that the data relating to the present invention is clearly superior and falls well outside the normal scatter expected for this type of test for the standard material, the 90% confidence band for the normal material is enclosed by broken lines. The interpretation of this band is that 90% of all possible cases will have a population means which falls within the band. These limits were established using standand stastical methods. The drawing shows that material of the present invention is well outside the statistical probability of being within the scatter band of the standard material. Because of the different kind of structure achieved in the bearing material of the present invention, it is anticipated that bearing failures should be reduced. An investigation over the years has indicated that many bearing failures were directly attributed either to the presence of massive carbides or to areas of carbide segregation. The presence of the small, uniformly dispersed carbides will act to increase the resistance to wear while lessening the severity of dislocation pileups and hence stress consentrations which accelerate crack initiation or propagation.

In addition, use of the present invention also serves to break up any large non-metallic inclusions thereby at least reducing the probability of having an inclusion in a stress zone where it might act as a fatigue nucleus. Previous studies have shown that non-metallic inclusions have a definite effect in reducing fatigue life if located in the region of maximum subsurface shear stresses. The microstructures of material processed according to the method of the present invention when examined by electron microscopy failed to reveal any non-metallic inclusion exceeding 0.0005" in diameter. However, examination of the same material, which had experienced only standard processing revealed relatively large non-metallic particles present in sizable numbers. From a present production and capability point of view, a maximum deformation level of about 85% is preferred because this level of work can be imparted to at full scale bearing component such as an inner or outer ring, ball or roller, without taxing presently available facilities beyond their capabilities.

Although the present invention has been described in connection with specific examples, it will be readily recognized by these skilled in the art of metallurgy and of bearing designs the variations and modifications such as of material and processing details of which the invention is capable without varying from its scope.

What is claimed is:
1. In a method of preparing for bearing applications a steel selected from the group consisting of martensitic and semiaustenitic steels of the secondary hardening type capable of being hardened to 58 Rockwell C or above, the steps of:
   plastically deforming the steel in an amount represented by the work developed in a reduction in cross-sectional area of at least 70% while the steel is in a metastable austenitic condition,
   air cooling the steel and then producing a bearing component from said steel.
2. The method of claim 1 in which the reduction in cross-sectional area is 70–85%; and, after air cooling the steel,
   tempering the steel at a temperature below that at which it was plastically deformed in the metastable austenitic condition to produce a microstructure having a fine, uniform carbide precipitation, substantially no massive carbide segregation, and fine martensite platelet size when viewed at magnifications of at least 3000.
3. The method of claim 2 in which the reduction in cross-sectional area is 70–80%.
4. The method of claim 3 in which the reduction in cross-sectional area is at about 80%.
5. The method of claim 1 comprising the preliminary steps of:
   heating the steel above the temperature at which austenite starts to form; and cooling the steel to its metastable austenitic condition prior to plastically deforming the steel; and, after air cooling,
   tempering the steel at a temperature below that at which it was plastically deformed in the metastable austenitic condition to produce a fine, uniform carbide precipitation, substantially no massive carbide segregation, and fine martensite platelet size when viewed at magnifications of at least 3000.
6. The method of claim 5 in which the steel is in the form of a bearing component, at least a surface of which is plastically deformed.
7. A bearing component of a steel selected from the group consisting of martensitic and semiaustenitic of the secondary hardening type having a minimum hardness level of 58 Rockwell C, the microstructure of which is characterized by a fine, uniform carbide precipitation, substantially no massive carbide segregation, a fine martensite platelet size when viewed at magnifications of at least 3000 and made by the method of claim 1.

8. The component of claim 7 in the form of a bearing inner ring.

References Cited

UNITED STATES PATENTS 2,934,463  4/1960  Schmatz et al. _____ 148—12.4

OTHER REFERENCES

Metal Selector, Steel, October 1963, page S–9.

Irvine et al., "Effect of Composition on Structure of Martensite," Journal of the Iron and Steel Institute, vol. 196, 160, pages 74–81.

McEvily et al., "An Investigation of the Notch Impact Strength of Ausformed Steels," Transactions, ASM, vol. 55, No. 3, September 1962, pages 654–666.

Zackay, "The Strength of Steel," Scientific American, vol 209, No. 2, August 1963, pages 72–82.

DAVID L. RECK, *Primary Examiner.*

HYLAND BIZOT, *Examiner.*

H. F. SAITO, *Assistant Examiner.*